(12) United States Patent
Buschmann et al.

(10) Patent No.: US 8,843,280 B2
(45) Date of Patent: Sep. 23, 2014

(54) CONSTRUCTION MACHINE WITH OPERATING MODE CONTROL

(75) Inventors: Martin Buschmann, Neustadt (DE); Arnold Rutz, Ludwigshafen (DE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 121 days.

(21) Appl. No.: 13/178,152

(22) Filed: Jul. 7, 2011

(65) Prior Publication Data

US 2012/0010787 A1    Jan. 12, 2012

(30) Foreign Application Priority Data

Jul. 9, 2010  (EP) ..................................... 10007101

(51) Int. Cl.
*G06F 19/00* (2011.01)
*E01C 19/48* (2006.01)
*E01C 19/20* (2006.01)
*G05B 19/425* (2006.01)

(52) U.S. Cl.
CPC ............... *E01C 19/48* (2013.01); *E01C 19/201* (2013.01); *G05B 2219/36482* (2013.01); *G05B 19/425* (2013.01)
USPC .......................................................... 701/50

(58) Field of Classification Search
CPC ..... E01C 19/00; E01C 19/002; E01C 19/004; E01C 19/006; E01C 19/008; E01C 19/02; E01C 19/18; E01C 19/182; E01C 19/185; E01C 19/187; E01C 19/20; E01C 19/2005; E01C 19/201; E01C 19/2015; E01C 19/202; E01C 19/2025; E01C 19/203; E01C 19/2035; E01C 19/204; E01C 19/2045; E01C 19/205; E01C 19/21; E01C 19/22; E01C 19/26; E01C 19/282; E01C 19/283; E01C 19/285; E01C 19/286; E01C 19/287; E01C 19/288; E01C 19/29; E01C 19/30; E01C 19/32; E01C 19/34; E01C 19/35; E01C 19/36; E01C 19/38; E01C 19/40; E01C 19/402; E01C 19/405; E01C 19/407; E01C 21/00; E01C 21/02; E01C 2301/00; E02F 9/20; E02F 9/2004; E02F 9/2008; E02F 9/2012; E02F 9/2016; E02F 9/202; E02F 9/2025; E02F 9/2029; E02F 9/2033; E02F 9/2037; E02F 9/2041; E02F 9/2045; E02F 9/205; E02F 9/2054; E02F 9/2058; E02F 9/2062; E02F 9/2066; E02F 9/207; E02F 9/02; G05B 19/4202; G05B 19/4205; G05B 19/4207; G05B 19/421; G05B 19/423; G05B 19/425; G05B 19/427; G05B 19/3648; A01B 63/00; A01B 63/002; A01B 63/004; A01B 63/006; A01B 63/008; A01B 63/02; A01B 63/023; A01B 63/026; A01B 63/04; A01B 63/045; A01B 63/06; A01B 63/08; A01B 63/10; A01B 63/1006; A01B 63/1013; A01B 63/102; A01B 63/104; A01B 63/106
USPC ...................................................... 701/50, 53
See application file for complete search history.

(56) References Cited

U.S. PATENT DOCUMENTS

| | | | |
|---|---|---|---|
| 4,026,658 A | | 5/1977 | Neuendorf et al. |
| 5,899,950 A | * | 5/1999 | Milender et al. ................ 701/50 |
| 6,871,483 B1 | * | 3/2005 | Panoushek ................ 56/10.2 E |
| 7,497,641 B1 | * | 3/2009 | Frelich .......................... 404/130 |

FOREIGN PATENT DOCUMENTS

| | | |
|---|---|---|
| DE | 10234217 B4 | 2/2009 |
| EP | 335339 B1 | 5/1992 |
| EP | 495171 B1 | 7/1992 |
| EP | 1544354 A2 | 6/2005 |
| EP | 1544354 A3 | 11/2007 |
| JP | 03199506 A | 8/1991 |
| JP | 2002048236 A | 2/2002 |
| JP | 2005279364 A | 10/2005 |

OTHER PUBLICATIONS

Translation of JP Office Action, mailed Jan. 8, 2013, which issued in corresponding JP Application No. 150854.

* cited by examiner

*Primary Examiner* — Jerrah Edwards
(74) *Attorney, Agent, or Firm* — Fish & Richardson P.C.

(57) ABSTRACT

The invention relates to a construction machine, in particular a road finishing machine, which can be set to at least two different operating modes by the operator. With a control system, a determined position for a drive can be stored in a first operating mode to which the drive automatically moves during a change from a second operating mode back to the first operating mode. In case of a change of the operating mode from the second operating mode to the first operating mode, several drives can optionally also be simultaneously moved to the previously stored position.

15 Claims, 1 Drawing Sheet

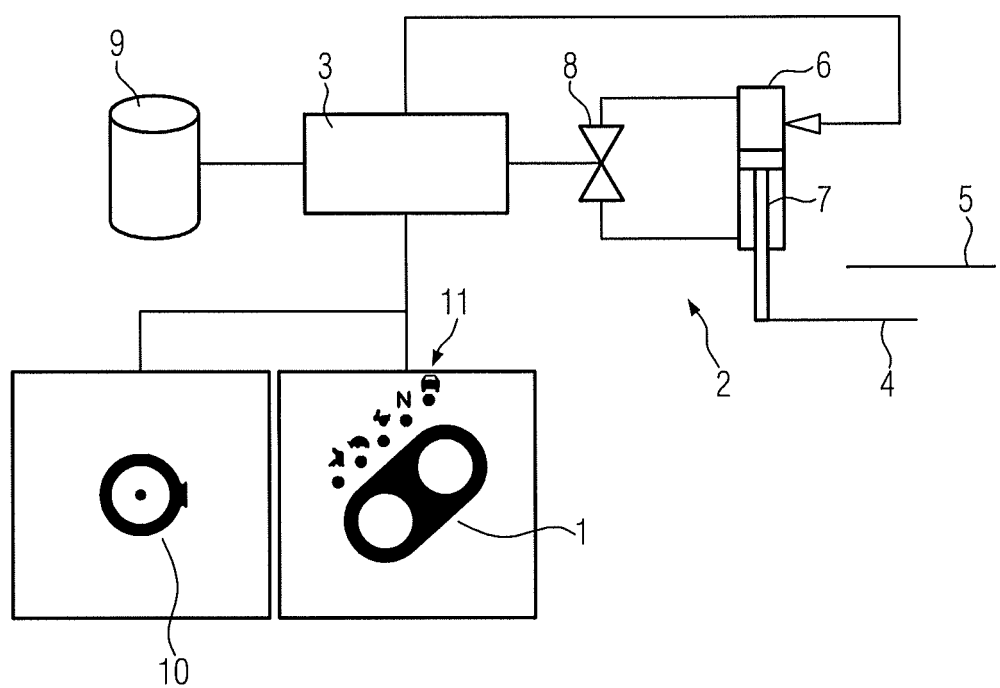

CONSTRUCTION MACHINE WITH OPERATING MODE CONTROL

The invention relates to a construction machine, in particular a road finishing machine, comprising an operating mode selector switch which determines at least one first operating mode and one second operating mode for the construction machine, at least one drive which is connected with a functional component of the construction machine and is adapted to adjust the functional component, and a control system to which the operating mode selector switch and the at least one drive are connected, and a method for the operation of a construction machine with a control system and at least one drive connected to the control system.

In practice, construction machines today are required to be intelligent, to relieve the operator, to supply optimal work quality, to be characterized by easy operability, to offer working comfort, to be operated in an environmentally friendly way and to ensure a high degree of working safety.

To control or monitor, respectively, different functions of a construction machine, in particular a road finishing machine, driver control panels are used as man-machine interfaces. By means of the driver control panel, for example the speed or the direction of the construction machine can be adjusted. On displays of the driver control panel, operating parameters which correspond to the current operation of the construction machine can be signaled to the operator. The operator can actively influence the operation of the construction machine by selecting various functions on the driver control panel. A certain function, however, is in most cases selected by depressing a key.

In an already known driver control panel of a road finishing machine, all important laying and finishing functions can be directly controlled via individual keys on the control panel. In particular, the finishing machine changes to a desired operating mode upon depression of a key. Depending on the selected operating mode, relevant adjustments at the machine are made automatically. For example, the driving position of the manual transmission is automatically selected by the control system depending on the operating mode. With a change of the operating mode, process-relevant parameters, e.g. the tamper speed or the vibration speed, can be also automatically retrieved. With an operating mode switch, one can select between a neutral operating mode, an operating mode for shifting, an operating mode for placing, an operating mode for laying, or an operating mode for transporting the road finishing machine.

The neutral operating mode can be used to run up the diesel engine or to preheat the screed heater. Preferably, all other drives of the finishing machine are blocked in the process.

If the operating mode for shifting is activated, gear stages permitting quick repositioning of the finishing machine are switched on to the finishing machine. In particular in case of a track change of the finishing machine, this operating mode can be employed to quickly dislocate the finishing machine.

For maneuvering and placing the finishing machine, the operating mode for placing is usually selected. In this operating mode, the finishing machine can only be moved at a low speed. Moreover, the drives of the finishing machine can be particularly sensitively controlled in this operating mode, making it possible to precisely maneuver the finishing machine.

During asphalting, the operating mode for laying is selected. For this, all automatic laying functions are available to the operator.

Finally, the operator can select the operating mode for transport, for example to drive the finishing machine on public roads.

From prior art, quick motion switches are also known which are installed in construction machines, in particular in mini-excavators. Depending on the work situation, it offers the driver a choice between maximum driving power and high travel speed.

For industrial purposes, operating mode selector switches are currently also offered which, apart from the selection of the operating mode, restrict or permit application-specific functions. In this case, application-specific authorities for the operation of the machine can be assigned depending on the operating mode thanks to an identification administration in the machine control.

The object underlying the invention is to improve a construction machine, in particular a road finishing machine, with simple constructive means such that the construction machine facilitates the operator's work and ensures a uniform and improved work result.

The set object is achieved with the apparatus and method of the present invention.

The invention relates to a construction machine, in particular a road finishing machine, comprising an operating mode selector switch which determines at least one first operating mode and one second operating mode for the construction machine, at least one drive which is connected with a functional component of the construction machine and adapted to adjust the functional component, and a control system to which the operating mode selector switch and the at least one drive are connected, wherein, when the first operating mode is adjusted, the control system is adapted to store a first position of the at least one drive, and wherein the control system is adapted to move the at least one drive from the first position to a second position, when the operating mode selector switch determines the second operating mode. According to the invention, the control system of the construction machine is adapted to automatically adjust the at least one drive from the second position, when the construction machine is in the second operating mode, to the stored first position when the operating mode selector switch determines the first operating mode.

The operating mode control according to the present invention, reduces the number of required operator interactions. Apart from the increased comfort for the operator, the operating mode control of the present invention also contributes to the prevention of operator errors to thus further improve the laying quality and operational safety. Moreover, the invention enables a shorter time frame, thus reducing labor costs and the fuel consumption of the construction machine.

In one suitable embodiment of the invention, the stored first position of the at least one drive is a laying position. It is moreover advantageous for the second position of the at least one drive to be a transport position. This is in particular advantageous when paved areas are built, such as parking lots or storage areas. With these construction works, one track is typically built next to the other, the machine constantly changing between laying and transport operations.

Preferably, the first operating mode of the construction machine is a laying operating mode. In the laying operating mode, specific functions which ensure safe laying of an asphaltic mixture can be available to the operator.

In another suitable embodiment of the invention, the second operating mode is a transport operating mode. In the transport operating mode, the construction machine or the road finishing machine, respectively, can be shifted safely, but also quickly.

It would be typical for the application if the functional component was a leveling cylinder, a screed, a spreading screw, a material bunker or a moving gear strike-off element. An automatic control of these functional components, as is possible by the invention, leads to an asphalting result of a particularly high quality.

Optionally, an execution key is provided, where, when the operating mode selector switch determines the first operating mode, the at least one drive is designed to automatically move from the second position to the stored first position when the execution key is depressed. Thereby, the operator can determine a point in time from which on a movement of the at least one drive to the first stored position or to the laying position is performed.

In a further suitable embodiment of the invention, the control system is adapted to adjust several drives simultaneously when the operating mode selector switch is set to the first or the second operating mode. In this fashion, several drives can be particularly quickly brought to the desired position.

It is also advantageous for the at least one drive to be a linear drive. In road construction, the linear drive fulfils a robust function for adjusting individual functional components. The linear drive is also insensitive to wear.

Another subject matter of the invention is a method for the operation of a construction machine with a control system and at least one drive connected to the control system. In this method, first a first operating mode is selected. Thereupon, the at least one drive is manually moved to a first position if no position has been stored yet. Then, the first position of the at least one drive is stored by the control system when the construction machine is in the first operating mode. Subsequently, a second operating mode is selected whereby the at least one drive moves to a second position. It is characteristic of the method that, when the first operating mode is selected again, the control system automatically moves the at least one drive to the stored first position with the changeover from the second operating mode to the first operating mode.

By the suggested method, the operator's potential for error can be considerably restricted. Different to conventional methods, in the invention, the operator does not have to move the drives individually to the desired position in case of a change of the operating mode. This will save time and ensure a uniform work result.

Preferably, the first position of the at least one drive is a laying position. It is ideal in particular for the laying position if the drives always move to the same position because thus a uniform asphalt layer will be formed.

Preferably, the second position of the at least one drive is a transport position. By this, one can quickly switch between the laying position and the transport position without requiring any considerable interactions by the operator.

In one suitable embodiment of the invention, a recording key is provided for recording recurring processes. To retrieve the recording, corresponding operational controls are preferably provided. It is thus for example possible that the operator of the construction machine or the road finishing machine actuates the recording key to store a sequence of operating mode changes at the beginning or end of the work. The respective operating mode and its set value are stored together with a relative time stamp. Preferably, time measurement begins with pressing the recording key. Pressing the recording key again will terminate the recording.

In a further suitable embodiment, the recorded sequence can be retrieved by actuating a start key. As sequences can be recorded both at the beginning of the work and at the end of the work, in the ideal case, the machine operator can operate and stop the machine with two keys.

The subject matter of the invention is schematically shown in FIG. 1.

FIG. 1 shows an operating mode selector switch 1, a drive 2 and a control system 3. In FIG. 1, the drive 2 is shown in a laying position 4. In addition, a transport position 5 the drive 2 can take is indicated in FIG. 1. The drive 2 can comprise a cylinder 6 in which a piston rod 7 is arranged, as is shown in FIG. 1. Pressure can act on the piston rod 7 from both sides. One can see a valve 8 which controls the cylinder 6 optionally hydraulically or pneumatically with pressure. A memory 9 is connected to the control system 3. To identify a position of the drive 2, the control system 3 is directly connected to the cylinder 6. Moreover, there is a direct connection between the control system 3, the valve 8, the memory 9 and the operating mode selector switch 1. Finally, in FIG. 1 an execution key 10 is shown which is also in direct connection with the control system 3. Symbol lights 11 are shown above the operating mode selector switch 1 which optionally indicate the selected operating mode to the operator by flashing. For example, for the transport operating mode, the symbol of a vehicle is chosen. Optionally, the control system 3, however, can also be connected with other keys, such as a recording key or a start key.

In operation, the operator can manually move the at least one drive 2 to the suited laying position 4 and store this position of the drive 2 when the construction machine is in the operating mode for laying. The stored position of the drive 2 is stored in the memory 9 and can be retrieved at a later point in time. If a different operating mode than the operating mode for laying is selected, the drive 2 moves to the transport position 5. In the transport position 5, the construction machine or the road finishing machine can, for example, change the track. If the laying operating mode is selected again, this is signaled to the control system 3, whereby the control system 3 causes the at least one drive 2 to automatically move to the previously stored laying position. It can be achieved thereby that one can always return from the transport operating mode to the same adjustments of the laying operating mode.

The method in accordance with the invention will now be illustrated by way of example with reference to the height adjustment of the screw system.

First, the laying operating mode is selected for the system. For this, the operator drives the screw manually to the level suited for laying. When the screw system has reached the suited level the latter is detected by a sensor. The sensor will then transmit the data of the level to the control system which will store them. Subsequently, the operator changes to one of the transport operating modes. In the process, the control system 3 automatically moves the screw level to a predefined transport position. Typically, this position is the highest position to ensure maximum clearance height. Optionally, the screw level can here also be manually adjusted by a key. If the screw is in the transport position, the operator can for example shift the machine from a laying end A to a laying beginning B. If the operator has reached the laying beginning B with the machine, he changes to the operating mode for laying. Thereupon, the control system 3 automatically moves the screw to the previously stored laying position. Optionally, the operator can actively initiate an adjustment of the screw to the laying position by pressing an execution key.

While the method has been illustrated using the example of the screw level adjustment, the described process is simultaneously possible for one, several or all functional components for laying.

The invention claimed is:

1. A road finishing machine, comprising
an operating mode selector switch which can select between at least a first operating mode and a second operating mode for the road finishing machine,
at least two drives which are each connected with a functional component of the road finishing machine and configured to adjust the operation of the functional component, wherein the at least two drives are linear drives,
an execution key, and
a control system to which the operating mode selector switch, the at least two drives and the execution key are connected, wherein, when the first operating mode is adjusted, the control system is adapted to store a first position of each of the at least two drives, the control system being adapted to move each of the at least two drives from the first positions to second positions when the operating mode selector switch selects the second operating mode, wherein the control system is configured to adjust the at least two drives simultaneously when the operating mode selector switch is set to the second operating mode, and wherein
the control system automatically and simultaneously changes the at least two drives from the second positions, when the construction machine is in the second operating mode, to the stored first positions when the operating mode selector switch selects the first operating mode and the execution key is pressed.

2. Road finishing machine according to claim 1, wherein the stored first positions of the at least two drives are laying positions.

3. Road finishing machine according to claim 1, wherein the second positions of the at least two drives are transport positions.

4. Road finishing machine according to claim 1, wherein the first operating mode is a laying operating mode of the road finishing machine.

5. Road finishing machine according to claim 4, wherein the second operating mode is a transport operating mode of the construction road finishing machine.

6. Road finishing machine according claim 1, wherein the functional component is a levelling cylinder, a screed, a spreading screw, a material bunker, or a moving gear strike-off element.

7. Method for the operation of a road finishing machine with a control system and at least two drives, an operating mode selector switch and an execution key connected to the control system, wherein the at least two drives are linear drives comprising the following steps:
selecting a first operating mode,
moving each of the at least two drives to a first position,
storing the first positions of the at least two drives by the control system when the road finishing machine is in the first operating mode,
selecting a second operating mode, whereby each of the at least two drives moves simultaneously to a second position, and
selecting a first operating mode, wherein during a change from the second operating mode to the first operating mode, the control system automatically moves the at least two drives simultaneously to the stored first positions when the operating mode selector switch selects the first operating mode and when the execution key is pressed.

8. Method according to claim 7, wherein the first positions of the at least two drives are laying positions.

9. Method according to claim 7, wherein the second positions of the at least two drives are transport positions.

10. Method according to claim 7, wherein a recording key is provided to record recurring processes.

11. Method according to claim 10, wherein the recording comprises processes which take place when the at least two drives move from the first to the second positions or from the second to the first positions.

12. Method according to claim 10, wherein a start key is provided for retrieving the recording.

13. Control system for a road finishing machine comprising an operating mode selector switch which can switch between at least one first operating mode and one second operating mode for the road finishing machine, at least two drives which are each connected with a functional component of the road finishing machine, an execution key, and a control system to which the operating mode selector switch, the at least two drives and the execution key are connected, wherein the at least two drives are linear drives, wherein, when the first operating mode is adjusted, the control system automatically stores a first position of each of the at least two drives, and wherein the control system moves the at least two drives from the first positions to second positions when the operating mode selector switch is switched to the second operating mode and the control system automatically adjusts the at least two drives simultaneously from the second positions, when the road finishing machine is in the second operating mode, to the stored first positions when the operating mode selector switch is switched to the first operating mode and when the execution key is pressed, wherein the control system is designed to adjust the at least two drives simultaneously when the operating mode selector switch is set to the second operating mode.

14. Control system according to claim 13, wherein the stored first positions of the at least two drives are laying positions.

15. Control system according to claim 14, wherein the second positions of the at least two drives are transport positions.

* * * * *